United States Patent
Clark

[11] Patent Number: 6,051,905
[45] Date of Patent: Apr. 18, 2000

[54] HOMOPOLAR GENERATOR

[76] Inventor: Richard Clark, 12629 N. Tatum Blvd. #605, Phoenix, Ariz. 85032

[21] Appl. No.: 09/154,694
[22] Filed: Sep. 17, 1998
[51] Int. Cl.[7] .................................................. H02K 31/00
[52] U.S. Cl. .......................... 310/178; 310/268; 310/309
[58] Field of Search .................................... 310/178, 268, 310/309; 361/329

[56] References Cited

U.S. PATENT DOCUMENTS

| | | | |
|---|---|---|---|
| 3,586,894 | 6/1971 | Mueller | 310/168 |
| 3,743,874 | 7/1973 | Chabrerie et al. | 310/178 |
| 3,944,865 | 3/1976 | Jewitt | 310/178 |
| 4,086,506 | 4/1978 | Kustom et al. | 310/178 |
| 4,097,758 | 6/1978 | Jenkins | 310/178 |
| 4,207,486 | 6/1980 | Hatch | 310/178 |
| 4,208,600 | 6/1980 | Hatch | 310/178 |
| 4,870,538 | 9/1989 | Baldwin | 361/321 |
| 4,897,592 | 1/1990 | Hyde | 310/309 |
| 5,481,149 | 1/1996 | Kambe | 310/178 |
| 5,530,309 | 6/1996 | Weldon | 310/178 |
| 5,587,618 | 12/1996 | Hathaway | 310/178 |

OTHER PUBLICATIONS

R. Kincheloe, Homopolar "Free Energy" Generator Test, Jun. 1986.

Primary Examiner—Elvin Enad
Assistant Examiner—Saeed Ghahramani
Attorney, Agent, or Firm—LaValle D. Ptak

[57] ABSTRACT

An electrical homopolar capacitor generator includes a set of stacked dielectric plates and conductive plates arranged in a magnetic field, with at least one of the dielectric plates is rotated relative to the remainder of the plates to generate an electrical output charge between the conductive plates. One version of the generator employs flat circular disks with an inner dielectric disk rotated relative to the others. The inner disk is placed between a pair of electrically conductive plates, which in turn are placed between a pair of first and second dielectric plates which are in a fixed relationship to the conductive plates. A second embodiment utilizes concentric cylinders in a similar arrangement to the stacked circular disk embodiment, with relative rotation of an inner dielectric being effected along a common axis for all of the cylindrical plates.

18 Claims, 3 Drawing Sheets

HOMOPOLAR GENERATOR

BACKGROUND

In the United States and throughout the world, there is increasing concern about the quality of air, particularly in large metropolitan areas. Air pollution is a significant problem in many metropolitan areas in the United States, such as Los Angeles, Calif., and in other large cities of the world, such as Bangkok, Kathmandu and Mexico City. It generally is agreed that a significant contributor to air pollution, particularly in large cities, is the internal combustion engine which is used in most automobiles and trucks. Such engines emit carbon monoxide and volatile unburned hydrocarbons, along with nitrogen oxide emissions. Substantial gains have been made in reducing the pollutants from internal combustion engines; but the ideal solution to the problem generally is conceded to be the utilization of electric vehicles, either battery powered, hybrid vehicles (those combining small internal combustion engines with electric motors and electric storage devices), or electric vehicles powered by fuel cells which burn hydrogen to generate electricity for operating an electric vehicle.

Electric drive vehicles, particularly battery-driven vehicles the wheels of which are turned by electric motors, have been known for as long as the internal combustion engine. Such vehicles, however, have never achieved a high degree of popularity, primarily because of the large weight and volume which is required by the batteries and the relatively short ranges which can be attained by such vehicles between battery charges. Electric vehicles currently on the market generally rely on lead-acid batteries charged from a standard wall plug. Lead-acid batteries are bulky and expensive; and in most practical applications they cannot drive a car over two hundred miles between charges. In most cases, the range between charges is even less than this. Electric vehicles using nickel-metal hydride batteries are capable of approximately doubling the range between charges for such electric vehicles. Nickel-metal hydride batteries, however, are extremely expensive, to the point that electric cars using such batteries essentially are impractical.

Even though battery driven electric vehicles currently (and for the foreseeable future) have a relatively limited range between chargings, the range which is available is one which is sufficient for a large number of city driving applications, particularly for a second or back-up vehicle. In addition, the ease of recharging the batteries from a wall outlet at home is a significant advantage for many users, since it eliminates the necessity of a trip to a refueling station, such as is required by gasoline powered vehicles.

Replacements which are under development for batteries in electric vehicles, or as a supplement to the batteries in such vehicles, are fuel cells which convert chemical fuel into electricity, flywheels which store energy in a spinning rotor, and ultra-capacitors which are capable of storing large amounts of electricity and which can be charged and discharged quickly.

Even though flywheels and ultra-capacitors used in conjunction with batteries can improve the efficiency of electric vehicles, the most optimistic projections which presently are available do not compare with the enormous amount of energy which is stored in a tank of gasoline. As a result, many researchers believe that the most popular electric drive vehicles in the future will be hybrids. Such hybrid vehicles are propelled by electric motors; but the electricity ultimately is obtained by small internal combustion engines that charge batteries, capacitors, rev up flywheels, or other power sources. For typical highway driving, only a relatively small amount of electrical energy is required; so that the internal combustion energy used to charge the batteries can be quite small. The storage cells then are charged during periods of low output, and are discharged rapidly when acceleration, steep hill climbing or other requirements are present.

Flywheels, used as energy storage devices, were first used in transportation applications in the 1950's. Flywheel powered buses were developed; and the flywheel rotors were revved up or accelerated at every stop. Composite rotors currently have been developed which can spin at very high revolutions (100,000 revolutions per second); and the speed is limited only by the tensile strength of the rim of the rotor. By using magnetic bearings, the friction on the axis of the rotor can be reduced sufficiently so that such rotors are capable of maintaining a major percentage of energy for several days.

Ultra-capacitors have been developed, primarily in conjunction with space applications and missile applications. These capacitors utilize manufacturing techniques which eliminate minuscule imperfections in the insulating film of capacitors which allows charges to leak away. The new materials make it possible to interleave the capacitor's dielectric and conductive plates extremely closely. As a result, ultra-capacitors have been developed which are capable of storing large amounts of energy in a relatively small volume. Such capacitors presently are available for use in calculators, watches, and electric razors.

One type of ultra-capacitor and its method of manufacture for a high energy density capacitor is disclosed in the United States patent to Baldwin U.S. Pat. No. 4,870,538. This capacitor is constructed of ceramic material interleaved with electrically conductive leads in a compact array which is capable of delivering its stored energy in extremely short discharge times, and providing high energy electrical pulses with extremely short rise times.

In the early 1800's Michael Faraday devised a machine called a homopolar generator. Such a generator consisted of a conducting disk rotating in an axial magnetic field. This machine was then operated as a generator with sliding brushes extracting current resulting from the voltage induced between the inner and outer regions of the disk when the rotational energy was supplied by an external driving source. The device also could be used as a motor when an external voltage was applied between the sliding brushes. A variation of this type of generator has been devised in the form of a hollow cylindrical dielectric, which is inserted into a stationary uncharged cylindrical capacitor (namely, an internal conductor and an external conductor surrounding the dielectric). When a uniform magnetic field was applied along the axis of this structure, the capacitor became charged as when the dielectric was rotated. This also is a homopolar effect, illustrating the effect of the static charge that is developed in the rotating dielectric. Widespread practical applications of this phenomenon, however, do not exist.

Three recent patents directed to variations of homopolar machines are the United States patents to Weldon U.S. Pat. No. 5,530,309, Kambe U.S. Pat. No. 5,481,149 and Hathaway U.S. Pat. No. 5,587,618. All three of these patents utilize the homopolar machine concept for use as a generator for producing high current, low voltage energy for various applications. The devices disclosed in these patents are bulky and not suitable for combination with battery storage cells used in conjunction with powering an electric vehicle.

It is desirable to provide a power generator which is suitable for use in conjunction with storage batteries for an electric car, and which employs homopolar effects to produce a charge on a capacitor in a manner which is efficient, compact and simple in construction.

SUMMARY OF THE INVENTION

It is an object of this invention to provide an improved direct current generator device.

It is another object of this invention to provide an improved homopolar capacitor generator.

It is an additional object of this invention to provide an improved homopolar ultra-capacitor generator.

It is a further object of this invention to provide an improved power generator utilizing a capacitor construction formed of stacked plates with a rotating intermediate dielectric plate operating in a permanent magnetic field for producing and storing energy for subsequent use.

In accordance with a preferred embodiment of the invention, an electrical homopolar capacitor generator comprises a stack of various plates assembled on a common axis. The stack of plates includes a first dielectric plate, a first electrically conductive plate, and intermediate dielectric plate, a second electrically conductive plate, and a second dielectric plate. The intermediate dielectric plate is rotated relative to the remainder of the other plates; and a permanent magnet produces a magnetic field in the region in which all of the plates are located; so that electrical power may be obtained from conductors coupled to the first and second electrically conductive plates.

DETAILED DESCRIPTION

Figure 1:
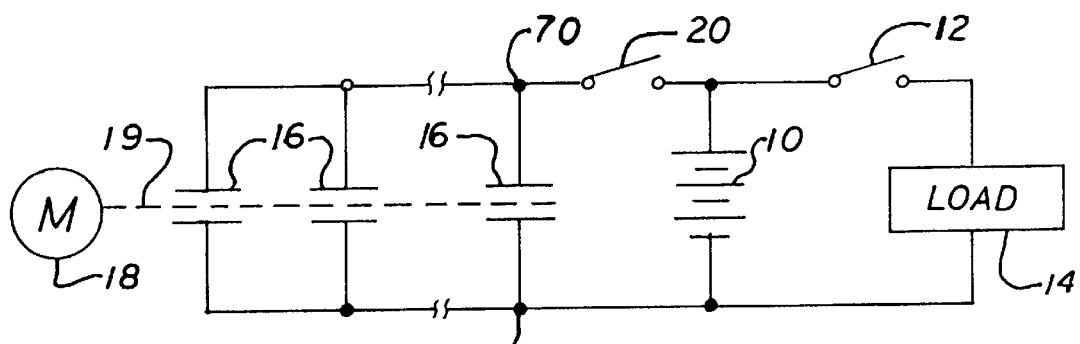
FIG. 1 is a diagrammatic representation of a preferred embodiment of the invention.

Reference now should be made to the drawings, in which the same reference numbers are used throughout the different figures to designate the same components. FIG. 1 is a schematic diagrammatic representation of a preferred embodiment of the invention illustrating its manner of use. As shown in FIG. 1, an electrical homopolar capacitor generator is illustrated as including a number of parallel-connected capacitors 16, which are indicated as having a motor driven rotating dielectric via a connection 19 driven by a motor 18. The capacitors 16 are connected across a pair of positive and negative terminals 70 and 72, respectively. When a switch 20 is in the open position illustrated in FIG. 1, the homopolar capacitor generator, consisting of the parallel capacitors 16, produces and holds a charge across the terminals 70 and 72. When ultra-capacitor materials are used for the capacitors 16, the charge across the terminals 70 and 72 can be both a large charge as well as one which is built up quickly in response to the rotation of the dielectric 19 in the presence of a magnetic field.

The remainder of the circuit shown in FIG. 1 consists of a battery or bank of batteries 10 connected through a switch 12 to a load 14. If the load 14 comprises the electric motors for driving the wheels of an electric car, the batteries 10 represent a conventional battery pack for such an electric car. The switch 12, when it is closed, permits the batteries 10 to operate the motor comprising the load 14. Other suitable loads 14, other than an electric car, may be employed for utilizing the energy stored in the battery 10 and applied through the switch 12 when it is moved from the open position shown in FIG. 1 to a closed position.

In order to charge the battery 10, the switch 20 periodically may be closed to complete a charging circuit across the battery 10 from the terminals 70 and 72. In this manner, the charge which is built up on the homopolar capacitor generator consisting of the motor 18, the rotating dielectric 19, and the capacitors 16, is used to recharge or supplement the charge on the battery 10; so that the load 14 may be operated for longer periods of time than would be possible without the homopolar charging mechanism applied across the terminals 70 and 72 and through the switch 20 to the battery 10.

Figure 3:
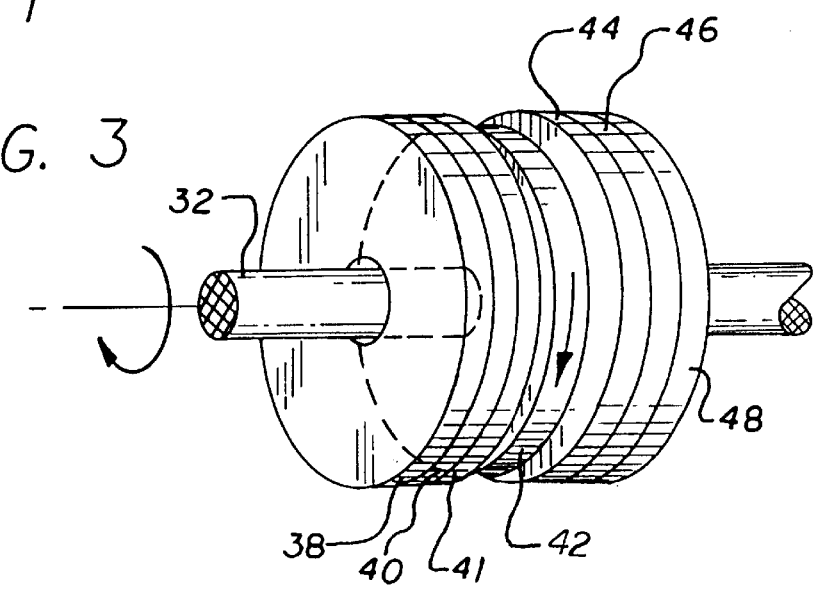
FIG. 3 is a partial perspective view of a portion of the embodiment shown in FIG. 2.
Figure 2:
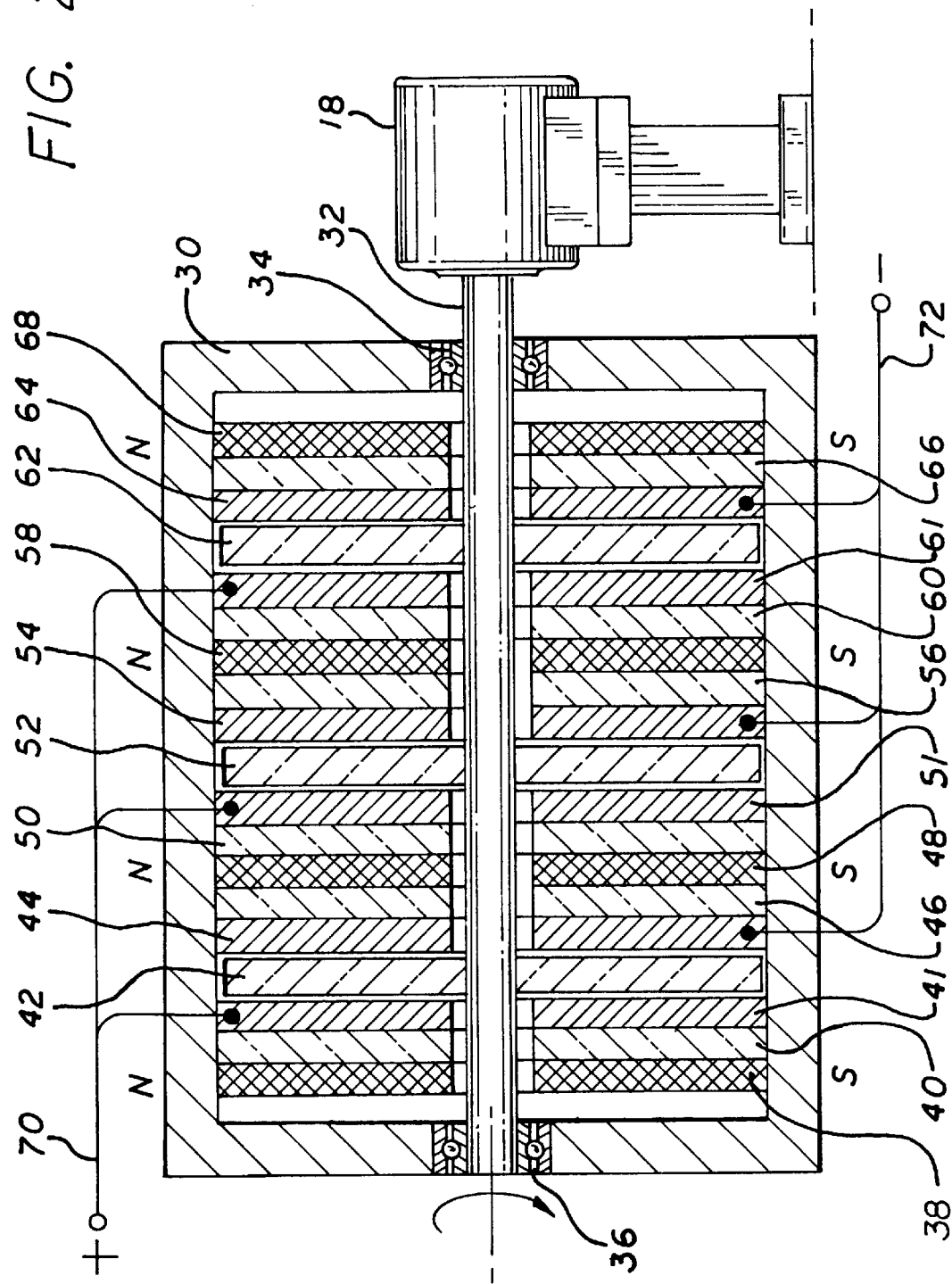
FIG. 2 is a cross-sectional view of a preferred embodiment of the invention.

Reference now should be made to FIG. 2, which is a cross-sectional view of a preferred embodiment for the homopolar capacitor generator which is illustrated diagrammatically in FIG. 1. In FIG. 2, the capacitor generator portion is enclosed within a housing 30, preferably fabricated of polycarbonate plastic. The motor 18 is illustrated as located outside the housing 30, rotating a diamagnetic shaft 32 through a pair of bearing sets 34 and 36 located in opposite ends of the housing 30. The capacitors 16 then are fabricated, as shown in FIGS. 2 and 3, from a series of stacks of closely adjacent plates. Ideally, the plates are made of the same materials used in ultra-capacitors, such as, for example, the materials used in the ultra-capacitor disclosed in the Baldwin U.S. Pat. No. 4,870,538 mentioned previously. As viewed in both FIGS. 2 and 3, from the left to the right, the end plate 38 comprises a circular plate in the form of a permanent magnet, which is magnetized as illustrated by the designations "N" and "S" shown in FIG. 2 in a direction perpendicular to the central axis of the diamagnetic drive shaft 32. Abutting the magnet 38 and located between it and a conductive plate 41 is a fixed dielectric plate 40. The plates 38, 40 and 41 are attached to the housing 30, and are spaced from the shaft 32, as shown clearly in FIG. 2.

The next element of the stack of plates comprises a circular dielectric plate 42, which is attached to and rotates with the shaft 32, again as shown most clearly in FIG. 2. The outer diameter or outer circumference of the dielectric plate 42 is spaced from the inner circumference of the housing 30, as illustrated in FIG. 2. The stack then is completed with another conductive plate 44, a fixed dielectric plate 46, and an outside or second magnet 48, as illustrated in FIGS. 2 and 3. This constitutes one unit or stack of plates forming one homopolar capacitor generator for a single one of the capacitors 16 shown in FIG. 1.

The configuration, however, may be repeated any number of times. Thus, the magnet 48, which forms the right-hand or second magnet of the assembly illustrated in FIG. 3, constitutes the left-hand magnet of another similar assembly consisting of a fixed dielectric plate 50, a conductive plate 51 separated from a second conductive plate 54, a dielectric plate 56, and another magnet 58 by means of a rotating dielectric 52. The sandwich or stack of plates continues and is illustrated with a final or third set in FIG. 2, consisting of the magnetic plate 58 forming the left-hand edge of it, a rotating dielectric 62, and terminated with a right-hand final magnet 68. Intermediate are a dielectric fixed plate 60, a second conductive plate 64, and a fixed dielectric plate 66.

All of the dielectric and conductive plates which are shown enclosed within the housing 30 in FIG. 2 may be manufactured with very close tolerances, and utilize the materials for the ultra-capacitor shown in Baldwin U.S. Pat. No. 4,870,538, or other suitable capacitor materials. All of the "left-hand" conductors, as viewed in FIG. 2, namely conductive plates 41, 51, and 61, are connected together in common to the terminal 70. This is the same terminal 70 shown in FIG. 1. Similarly, the conductive plates on the opposite side of each of the rotating dielectric plates 42, 52 and 62, namely the conductive plates 46, 56 and 66, are connected together in common to the terminal 72.

The motor 18 rotates the shaft 32 at relatively high rates of speed. Typically, rotational speeds of 6,000 revolutions per minute to 15,000 revolutions per minute are utilized. The range of speeds, however, is not limited to this range. In a typical structure in an electric car, the various plates shown within the housing 30 have a 16" diameter, of course, allowing for clearance of the outer circumference of the outer rotating dielectric plates 42, 52 and 62 from the internal diameter of the housing 30. The energy which is generated by this generator is determined by the formula: $E = v \times Bk$ where: B is the magnetic flux generated by the permanent magnets 38 in a direction parallel to the plane of the dielectric plates 40 and 42, v is the rotational velocity of the shaft 32, and k is a constant which is representative of the permittivity or dielectric constant of the capacitor. From this formula, it is clear that the energy is directly dependent upon the magnitude of the magnetic flux and the angular velocity of the rotation. The higher both of these numbers are, the greater the amount of energy (E) is generated by the structure.

Preferably, the magnets which are used for the magnetic disks 38, 48, 58 and 68 constitute high permeability permanent magnets, which can be either ceramic magnets or other suitable materials, such as Neodymium iron boron (NDIE). The generation of power in the homopolar generator capacitor shown in FIGS. 2 and 3 is achieved in accordance with the known techniques for obtaining electrical current from such a generator. By incorporating the homopolar principles as in integral part of an ultra-capacitor, however, the desired high retention, high return capabilities for the generated energy for subsequent use in charging the battery 10 are achieved in a compact, integral unit. The homopolar generator is an integral part of the ultra-capacitor, and vice-versa. The two are intertwined together as a single unit, as shown in FIGS. 2 and 3, to achieve the highest level of efficiency in operation.

When the device shown in FIGS. 2 and 3 is used as part of an electric car, the shaft 32 may be rotated by the axle of the vehicle itself (instead of or in addition to the motor 18) to recover energy as the vehicle rolls along. This allows recovery of part of the energy which is expended in the operation of the electric motors driving the vehicle; so that this energy recovery extends the charge on the batteries. In the alternative, the motor 18 could be a small internal combustion engine used to operate the homopolar capacitor generator to provide recharging current for the batteries 10, if the device is used in a hybrid vehicle of the type described previously.

Figure 4:
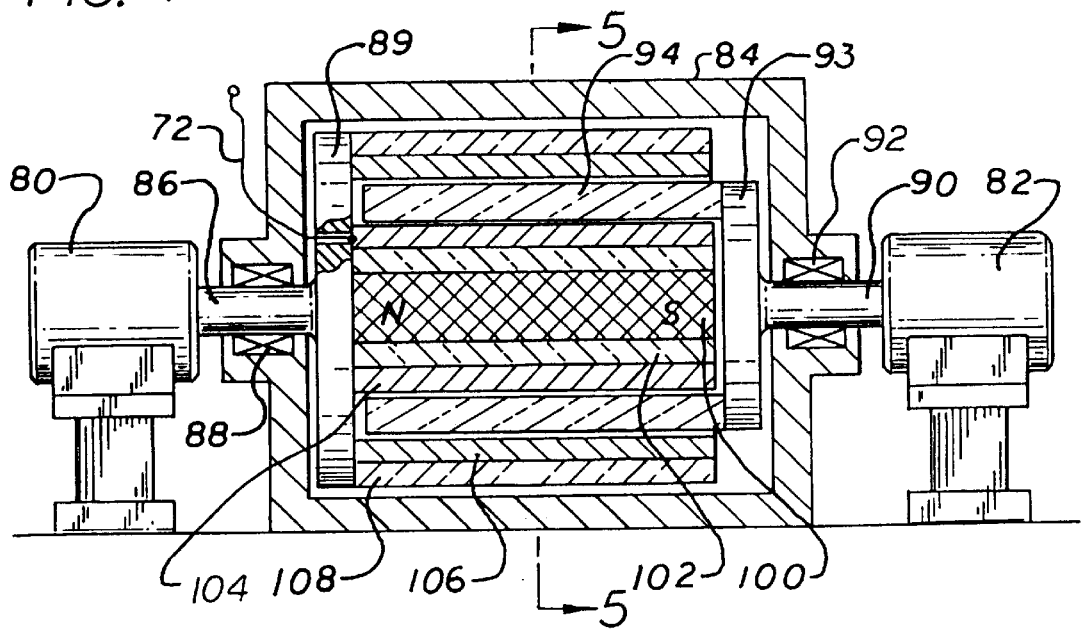
FIG. 4 is a cross-sectional view of an alternative embodiment of the invention.
Figure 5:
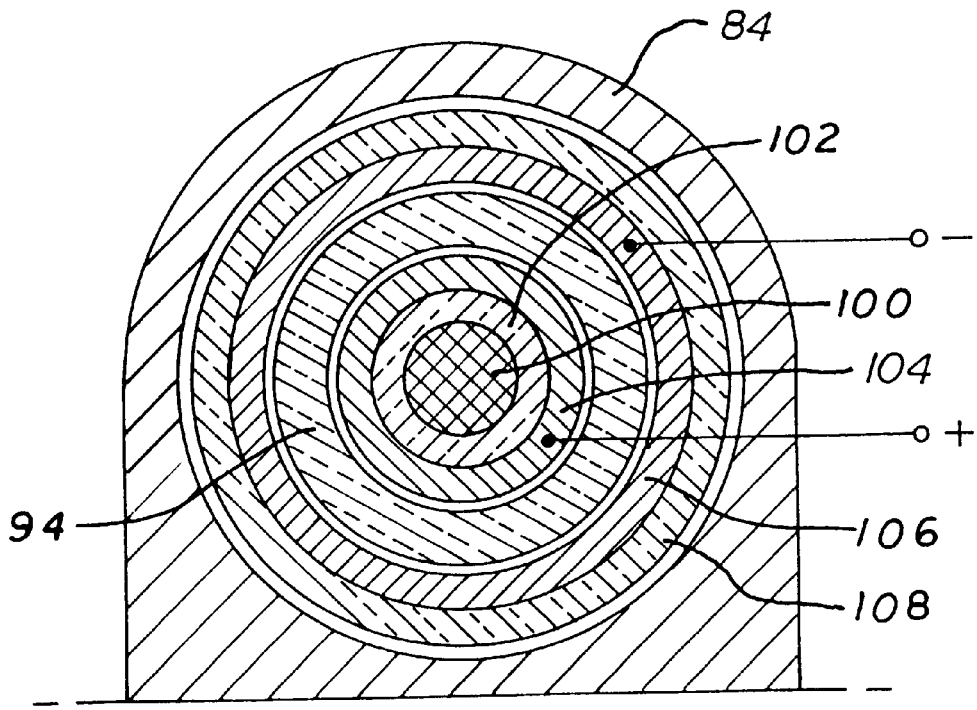
FIG. 5 is a cross-sectional view taken along the line 5—5 of FIG. 4.
Figure 6:
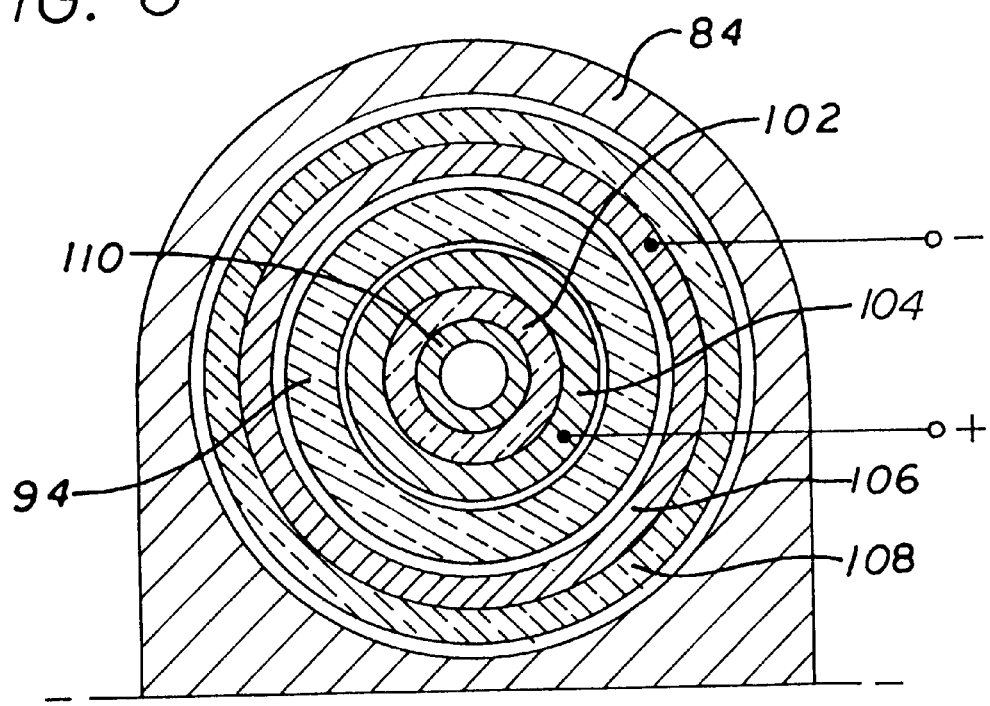
FIG. 6 is a cross-sectional view similar to that of FIG. 5 showing a variation in the structure of the embodiment of FIG. 5.

FIGS. 4 and 5 illustrate an alternative to the flat disk generator structure shown in FIGS. 2 and 3. In FIGS. 4 and 5, the same principles for an integrated homopolar generator/ultra-capacitor are achieved by the utilization of the relative rotation of nested cylinders. In the device shown in FIGS. 4 and 5, an outer housing 84, made of a non-conductive, non-magnetic material, is provided. An internal cylindrical core, which may either be a solid magnetic core 100 magnetized parallel to its axis, as illustrated in FIG. 5, or a hollow core, such as the shaft 110 shown in FIG. 6, also magnetized parallel to its axis, is attached to a non-conductive plate 89, which in turn is illustrated in FIG. 4 as attached to a shaft 86 driven by a motor through a bearing set 88. Alternatively, the assembly including the central cylindrical core 100/110 may be attached to a plate 89, which does not rotate but is held in a fixed position. The device shown in FIGS. 4 and 5, however, is illustrated as a counter-rotating device to achieve greater relative rotational speeds with a lower shaft rotation of the device. It should be noted, however that the operation is the same whether the plate 89 is fixed or rotated by the motor 40 through the shaft 86, since relative rotation of various parts is what is used to effect the homopolar capacitor generator effect. In a manner which is similar to the structure of the flat disk configuration of FIGS. 2 and 3, nested cylinders of dielectric conductors are provided in a stack of cylinder "plates" much in the same manner as the stack of flat plates described previously. The next cylinder is the cylinder 102 in the form of a dielectric, which is in contact with the central magnetic core 100. Next is a conductive cylinder 104, which then is spaced from another conductive cylinder 106, with an outer dielectric cylinder 108 all attached to the circular plate 89.

On the other side of the device, a motor 82 is used to drive a shaft through a bearing 92 connected to a non-conductive circular plate or disk 93. Around the outer edge of the disk 93, a cylindrical dielectric 94 is attached for rotation between the cylinders 104 and 106 constituting the conductive plates of the homopolar capacitor construction.

When the dielectric cylinder 94 is rotated relative to the cylinders attached to the plate 89, a homopolar generator effect takes place, charging the ultra-capacitor which is made of the same materials described previously in conjunction with FIGS. 2 and 3 to constitute the homopolar generator capacitor 16 illustrated in FIG. 1. The operation is the same. The conductive cylinder 106 is connected to the terminal 70; and the conductive cylinder 104 is connected to the terminal 72 in the same manner described above in conjunction with the conductive disks 41 and 44 and their connections in conjunction with FIGS. 2 and 3.

If the plate 89 is rotated in an opposite direction to the rotation of the plate 93, a groove needs to be cut through the plate 89 which is narrower than the thickness of the conductive plate 102, to permit a brush to be used to obtain the current flow for the terminal 72. If, however, the plate 89 does not rotate (that is, there is no motor 80 and shaft 86 connected to it), a connection can be made directly through the plate 89 to the conductive cylinder 104 to effect the connection to the terminal 72. It should be noted that whether a single rotation is effected by means of the motor 82 and the shaft 90, to provide the homopolar capacitor generator effect, or whether two counter rotating shafts 90 and 86, rotated by the respective motors 82 and 80, are used, the operation is the same. The relative speed of rotation, again, is in the range of 6,000 to 15,000 RPM relative rotation between the two parts of the generator shown in FIGS. 4 and 5 or 4 and 6.

It should be noted that, for example, with respect to FIG. 2 where the motor 18 and shaft 32 are used to spin the dielectric plates 42, 52, 62, these plates could be held in a fixed relationship with all of the remainder of the plates described previously rotating around them. The homopolar capacitor generator effect which has been described is obtained by means of relative rotation of the various parts or sets of parts. Similarly, the action which has been described in conjunction with FIGS. 4, 5 and 6 may be effected by rotating either or both of the respective groups of cylinders to achieve the desired result.

The foregoing description of the preferred embodiments of the invention are to be considered illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. An electrical homopolar capacitor generator including in combination:
    a stack of various plates assembled on a common axis in the order named;
    a first dielectric plate;
    a first electrically conductive plate;
    an intermediate dielectric plate;
    a second electrically conductive plate;
    a second dielectric plate;
    a device for effecting relative rotational movement of said intermediate dielectric plate with respect to the remainder of said dielectric plates and said conductive plates;
    a permanent a magnetic field in the region in which all of said dielectric plates and said conductive plates are located;
    a first conductor connected to said first conductive plate; and
    a second conductor connected to said second conductive plate.

2. The combination according to claim 1 wherein said first and second dielectric plates and said intermediate dielectric plates are made of ceramic ultra-capacitance material.

3. The combination according to claim 2 wherein said magnetic field is created by at least one permanent magnet located adjacent the remainder of said dielectric plates and said electrically conductive plates.

4. The combination according to claim 3 wherein said first and second dielectric plates, said first and second electrically conductive plates and said intermediate dielectric plates all are in the form of flat circular disks located in close proximity to one another on a common central axis, wherein said device for effecting relative rotational movement of said intermediate dielectric plate includes a shaft coupled with said intermediate dielectric plate and passing through the centers of said first and second dielectric plates and said first and second electrically conductive plates for rotating said intermediate dielectric plate relative to said other plates.

5. The combination according to claim 4 wherein said permanent magnet is a magnetic plate in the form of a first flat circular magnetic disk located in close proximity to at least one of said first and said dielectric plates and magnetized in a direction to cause the magnetic flux to be parallel to said plates.

6. The combination according to claim 5 further including a second flat circular magnetic disk located adjacent the other of said first and second dielectric plates and magnetized in the same direction as said first magnetic plate.

7. The combination according to claim 6 wherein said first and second dielectric plates, said first and second electrically conductive plates all are located in a housing in fixed relationship to one another, and said intermediate dielectric plate is mounted for rotation in said housing by said device for effecting relative rotational movement.

8. The combination according to claim 1 wherein said magnetic field is created by at least one permanent magnet located adjacent the remainder of said dielectric plates and said electrically conductive plates.

9. The combination according to claim 8 wherein said permanent magnet is a magnetic plate in the form of a first flat circular magnetic disk located in close proximity to at least one of said first and said dielectric plates and magnetized in a direction perpendicular to the central axis through said plates.

10. The combination according to claim 9 further including a second flat circular magnetic disk located adjacent the other of said first and second dielectric plates and magnetized in the same direction as said first magnetic plate.

11. The combination according to claim 1 wherein said first and second dielectric plates, said first and second electrically conductive plates all are located in a housing in fixed relationship to one another, and said intermediate dielectric plate is mounted for rotation in said housing by said device for effecting relative rotational movement.

12. The combination according to claim 1 wherein said first and second dielectric plates, said first and second electrically conductive plates and said intermediate dielectric plates all are in the form of flat circular disks located in close proximity to one another on a common central axis, wherein said device for effecting relative rotational movement of said intermediate dielectric plate includes a shaft coupled with said intermediate dielectric plate and passing through the centers of said first and second dielectric plates and said first and second electrically conductive plates for rotating said intermediate dielectric plate relative to said other plates.

13. The combination according to claim 1 wherein said generator comprises a set of concentric cylinders with said first dielectric plate comprising the outermost cylinder, said first electrically conductive plate comprising a first conductive cylinder joined in physical contact inside said outermost cylinder; said intermediate dielectric plate being spaced from said first electrically conductive plate cylinder and comprising a cylinder concentrically located within said first electrically conductive plate cylinder; said second electrically conductive plate comprising a concentric cylinder located within and spaced from said intermediate dielectric plate cylinder; and said second dielectric plate comprising a concentric cylinder located within and in physical contact with said second conductive plate cylinder.

14. The combination according to claim 13 wherein said magnetic field is created by a permanent magnet on a core mounted within said concentric cylinder comprising said second dielectric plate.

15. The combination according to claim 14 wherein said relative movement of said plates is effected by rotating said intermediate dielectric plate cylinder relative to the concentric cylinders comprising said first and second dielectric plates and first and second electrically conductive plates.

16. The combination according to claim 15 wherein said magnet comprises an elongated cylinder with said permanent magnetic field extending parallel to the axis thereof.

17. The combination according to claim 13 wherein said first and second dielectric plates and said intermediate dielectric plates are made of ceramic ultra-capacitance material.

18. The combination according to claim 13 wherein said relative movement of said plates is effected by rotating said intermediate dielectric plate cylinder relative to the concentric cylinders comprising said first and second dielectric plates and first and second electrically conductive plates.

* * * * *